(12) United States Patent
Lane et al.

(10) Patent No.: US 7,964,010 B2
(45) Date of Patent: Jun. 21, 2011

(54) COALESCING FILTER ELEMENT

(75) Inventors: Brian Lane, Hebburn (GB); David Porter, Newcastle-upon-Tyne (GB)

(73) Assignee: Domnick Hunter Limited, Birtley, County Durham (GB)

( * ) Notice: Subject to any disclaimer, the term of this patent is extended or adjusted under 35 U.S.C. 154(b) by 1370 days.

(21) Appl. No.: 10/521,884

(22) PCT Filed: Jul. 22, 2003

(86) PCT No.: PCT/GB03/03158
§ 371 (c)(1),
(2), (4) Date: Oct. 20, 2005

(87) PCT Pub. No.: WO2004/009210
PCT Pub. Date: Jan. 29, 2004

(65) Prior Publication Data
US 2006/0124528 A1    Jun. 15, 2006

(30) Foreign Application Priority Data
Jul. 23, 2002   (GB) .................................. 0217024.9

(51) Int. Cl.
*B01D 39/00*   (2006.01)
*B01D 50/00*   (2006.01)
*B01D 59/50*   (2006.01)
(52) U.S. Cl. .............. 55/498; 55/323; 55/337; 55/385.3
(58) Field of Classification Search ............ 55/498, 55/385.3, 323, 337, 316; 210/61
See application file for complete search history.

(56) References Cited

U.S. PATENT DOCUMENTS

| | | | | |
|---|---|---|---|---|
| 2,216,939 A | * | 10/1940 | Dodge | 96/188 |
| 2,425,410 A | * | 8/1947 | Zeitlin et al. | 55/409 |
| 2,754,970 A | * | 7/1956 | Dalrymple | 210/194 |
| 3,386,230 A | * | 6/1968 | Riesberg et al. | 55/337 |
| 3,633,343 A | * | 1/1972 | Mark | 96/118 |
| 4,020,783 A | * | 5/1977 | Anderson et al. | 116/268 |

(Continued)

FOREIGN PATENT DOCUMENTS

DE           100 19 293 A1      10/2001

(Continued)

OTHER PUBLICATIONS

Translation of foreign patent DE 10019293.*

*Primary Examiner* — Walter D Griffin
*Assistant Examiner* — Amber Orlando
(74) *Attorney, Agent, or Firm* — Maginot, Moore & Beck

(57) ABSTRACT

A coalescing filter element for removing liquid droplets from a gas stream comprises a wall which is made of a coalescing filtration material and which defines a hollow space within it. An end cap at one end of the element has a port in it through which gas is supplied to the hollow space to flow through the wall of the filtration material. The end cap has a peripheral portion which engages the element wall and a tube which extends into the hollow space defined by the element wall, so that the port in the end cap comprises an inner opening defined by the tube and at least one peripheral opening located between the tube and the peripheral portion of the end cap. The tube extends beyond the peripheral opening(s) so as to deliver gas to a region of the element wall which is remote from the end cap.

9 Claims, 2 Drawing Sheets

| U.S. PATENT DOCUMENTS | | | |
|---|---|---|---|
| 4,487,618 A | 12/1984 | Mann | |
| 4,516,994 A | 5/1985 | Kocher | |
| 6,143,049 A * | 11/2000 | Gieseke et al. | 55/385.3 |
| 2007/0186524 A1 * | 8/2007 | Pearson et al. | 55/486 |
| 2007/0209341 A1 * | 9/2007 | Pearson et al. | 55/418 |
| 2007/0271884 A1 * | 11/2007 | Pearson et al. | 55/410 |

| FOREIGN PATENT DOCUMENTS | | |
|---|---|---|
| GB | 2 126 497 A | 3/1984 |
| WO | WO 94/05396 | 3/1994 |

* cited by examiner

COALESCING FILTER ELEMENT

This invention relates to a coalescing filter element for removing liquid droplets from a gas stream.

Filtration of gas in a compressed gas stream is generally required so that the gas is sufficiently clean for a subsequent application, or to minimise adverse effects of impurities on components of the system. For example, removal of compressor oil can be required to minimise chemical contamination and accumulation on valves which might lead to malfunction of the valves, and removal of particulate solid material can be required to minimise abrasion.

Coalescing filters are used to collect liquid that is entrained in a gas stream by causing aerosol droplets of the liquid to coalesce and collect as drops, which can flow as a liquid. They generally comprise several layers of filter media. The density and thickness of the media layers are selected according to the flow rate of the gas stream, the level and nature of the impurities in the gas stream, the level of impurity that is sought in the gas stream after filtration and so on.

Common filter constructions comprise a tubular filter element mounted in a tubular housing. The gas to be filtered passes radially through the wall of the filter element. Solid particles entering the filter housing are collected by the filter element. Liquid droplets, possibly as aerosols, entrained in the gas are collected by the filter element. The droplets can coalesce to form drops, which then collect at the base of the filter element for drainage. Clean gas can then be discharged from the filter.

Coalescing filter elements of this type can be arranged so that gas to be filtered flows radially inwardly through the filter media which provide the wall of the element. The gas is supplied to the cavity around the element, between the element and the wall of the housing. It then passes inwardly through the element for discharge from the space within the element to the end use application.

It is more common for coalescing filter elements to be arranged so that gas to be filtered flows radially outwardly through the element wall: the gas is then supplied to the cavity within the element and passes outwardly through the element wall for discharge from the space between the outer surface of the element and the wall of the housing. Elements of this latter kind are sometimes referred to as "in-to-out" filter elements, reflecting the direction of flow of gas through the filter medium.

The present invention is concerned with an in-to-out filter element in which gas to be filtered is supplied to the cavity within the filter element through a port in an end cap, in which the port comprises an inner opening defined by a tube and at least one peripheral opening with the tube extending beyond the peripheral opening(s) so as to deliver gas to a region of the element wall which is remote from the end cap.

Accordingly, in one aspect, the invention provides a coalescing filter element for removing liquid droplets from a gas stream, which comprises a wall which is made of a coalescing filtration material and which defines a hollow space within it, and an end cap at one end of the element which has a port in it through which gas is supplied to the hollow space to flow through the wall of the filtration material, the end cap comprising a peripheral portion which engages the element wall and a tube which extends into the hollow space defined by the element wall, so that the port in the end cap comprises an inner opening defined by the tube and at least one peripheral opening located between the tube and the peripheral portion of the end cap, with the tube extending beyond the peripheral opening(s) so as to deliver gas to a region of the element wall which is remote from the end cap.

The filter element of the invention has the advantage that it enables contaminant material which is entrained to flow in the gas stream to be distributed more evenly through the length of the filter element.

The tube which defines the inner opening can be supported by means of one or more formations which extend between it and the peripheral portion of the end cap. Preferably, the or each formation has an appreciable axial extent so that the tube is supported by means of at least one vane which extends between it and the peripheral portion of the end cap. It can be preferred for the tube to be arranged substantially centrally in the end cap.

Preferably, the end cap includes at least three vanes, more preferably at least four support formations, for example at least six vanes or at least eight support formations extending between the tube and the peripheral portion of the end cap. It will generally be preferred for the support formations to be arranged symmetrically around the axis of the element. (The axis of the element will usually be defined by the general direction of flow of gas through the port in the end cap, and the filter element will often be rotationally symmetrical about that axis.)

Peripheral openings in the end cap, between the tube and the peripheral portion of the end cap, can be separated around the end cap by the support formations. For example, when there are three support formations, there can be three peripheral openings. Each of the peripheral openings can then have a radial extent of approximately 120° (when the support formations are thin, which will be preferred in order to minimise resistance to flow of gas).

Preferably, the ratio of the length of the tube measured from the edge of the element wall where the end cap engages the wall, to the overall length of the wall, is at least about 0.1, preferably at least about 0.25, for example at least about 0.4.

Preferably, the ratio of the area of the inner opening in the port (defined by the tube) to the total area of the peripheral opening (or openings) is at least about 0.25, preferably at least about 0.4. Preferably, the said ratio is not more than about 0.75, more preferably not more than about 0.6.

Preferably, at least one vane in the end cap is configured to impart a helical flow (relative to the axis defined by the port) to gas flowing through the port in the end cap into the hollow space defined by the wall. Such a vane can be provided in the or at least one peripheral opening in the end cap. Such a vane can be provided in the tube which extends into the hollow space. It appears that the helical flow that is imparted to gas entering the filter element can lead to a more even distribution of contaminant material in the gas stream over the length of the filter element: particles and droplets of contaminant material will generally tend to be relatively heavy, and the helical flow can result in them being directed further into the filter element than has been the case in known elements. Furthermore, primary separation of liquid droplets from the gas stream can be facilitated as a result of the helical flow of gas entering the element. This can facilitate collection of aerosol liquid droplets to form drops on the surface of the coalescing filter media, so that the droplets then collect within the media and flow to the base of the element. These benefits in terms of improved filtration efficiency are significant. Furthermore, it has been found that the operating lifetime of a filter element is not affected adversely by localised collection of entrained liquid droplets on the wall of the filter element close to the inlet port.

When a helical flow is imparted to gas flowing through a central tube in an end cap, this can be achieved by means of at least one vane in the tube. Preferably, there are at least two vanes, more preferably at least three vanes, for example at least four vanes. When there are two or more vanes, they can be arranged symmetrically around the axis of the tube, preferably such that they meet at the axis.

The nature of a helical flow which is imparted to gas entering the hollow space within the tubular element can be characterised as a twisted flow. It can also be characterised as a cyclonic gas flow. A characteristic of the flow that is imparted to the gas is that, instead of flowing in a direction which is parallel to the element axis, the movement of the gas includes a component which involves the gas flowing around the said axis.

A further advantage of imparting a helical flow to gas entering the hollow space within the tubular element is that the reaction of the element to the helical flow imparted by the vanes can be relied on to minimise the risk of the filter element becoming detached from its housing. This advantage applies in particular for example when the filter element is fitted into its relevant housing part by a twisting action, for example relying on threaded or bayonet formations.

Preferably, at least some of the vanes, generally each of the vanes, has a twisted non-planar configuration. However, it is envisaged that a helical flow can be imparted to gas entering the hollow space within the tubular element using vanes which are planar, but arranged so that the plane of each vane is inclined to the axis of the element. Preferably, the angle between each vane and the axis of the element, when the element is used in cross-section, is at least about 3° more preferably at least about 5°, for example at least about 10°. The said angle will generally be less than about 60°, preferably less than about 50°, especially less than about 30°, for example less than about 20°. It has been found that useful helical flow can be obtained with vanes in which the angle of inclination relative to the element axis is small. When the vanes have a twisted non-planar configuration, the angle of inclination of the vane to the axis of the element is measured with reference to the inclination of a straight line which represents the best fit alignment of the vane at approximately its mid point. A filter element in which a helical flow is imparted to gas flowing through the end cap is the subject of a patent application filed with the present application entitled A Coalescing Filter Element and bearing the agents' reference P11700. Subject matter disclosed in the specification of that application is incorporated in this specification by this reference.

The coalescing filtration material that is used in the filter element of the present invention will be selected according to the nature of the gas that is being filtered, the nature of the contaminants (liquid droplets, aerosols, solid particles etc) to be filtered from the gas, the pressure differential across the filter and so on. Examples of media materials which can be used in the filter element include foamed polymers (such as polyurethane and polyesters), glass and borosilicate fibre materials, polymeric materials such as polyolefins (especially polyethylene and polypropylene) especially in the form of fibres, paper base materials and so on. Examples of suitable features for the filter element of the invention can be found in filter elements sold by Domnick Hunter Limited under the trade mark OIL-X.

The filter element of the invention can be used to separate contaminants, especially liquid carried as aerosol droplets, in a pressurised gas medium. The filter element can be used in particular to separate compressor oil droplets from compressed gas, for example in refrigeration equipment.

Liquid which is collected from the gas stream following coalescence of aerosol droplets will collect within a housing for the filter element at a low point therein. The housing will generally include a device at its low point which allows liquid which has collected to be removed from the housing. The drain should preferably be configured to facilitate drainage of collected liquid without loss of pressure within the housing. An example of a suitable drain device is disclosed in EP-A-81826. Generally, the filter element of the invention will be arranged to operate with its axis substantially vertical. The end cap with the port in it for gas to enter the hollow space will be a top end cap. Generally, the filter element will be closed at its base by means of a base end cap to preserve the pressure differential across the element, and to prevent by-pass flow of the gas stream between the housing inlet and outlet.

It can be preferred for the base of the filter element to include a raised central portion so that liquid which collects on the inlet side of the element (before gas introduced to the space within the element passes through the element wall) drains to the base thereof, to collect around the edge of the base, at the bottom edge of the element wall. This can have the advantage of allowing the liquid to settle, reducing the risk of re-entrainment of liquid in gas as it flows through the element wall. Liquid which collects within the element and the bottom edge of the element wall can drain through the element wall to flow with liquid which coalesces within the element to the base of a housing for the element. The provision of a raised central portion in the base of the element can also encourage helical movement of gas within the element, around the axis of the element.

The end cap with the inlet port for gas which is to be filtered can be made from polymeric material, especially by moulding. A base end cap when present can be made from polymeric material, especially by moulding. Metallic materials can also be used for the or each end cap. A suitable polymeric material will be selected for its chemical resistance. It should also be able to withstand stresses to which it is exposed during manufacture and use. Suitable polymeric materials will generally lend themselves to manufacturing techniques involving moulding. Examples of suitable polymeric materials include polyolefins, polyesters, polycarbonates.

The filter element of the present invention can be made by conventional techniques which are used to make products of this kind. It will be important for appropriate fluid-tight seals to be formed between the end cap and the element wall provided by the filtration material. For example, suitable seals can be provided by one or more of mechanical connections (for example interference fit) and the use of bonding materials such as adhesives. Such techniques are used commonly in the construction of coalescing filter elements, for example as sold by Domnick Hunter Limited under the trade mark OIL-X.

The dimensions of the filter element will be selected according to the intended application. Elements according to the invention can be made with a range of sizes and configurations, including a range of aspect ratios (ratio of height to transverse dimension).

Embodiments of the present invention will now be described by way of example with reference to the accompanying drawings in which.

Figure 1:
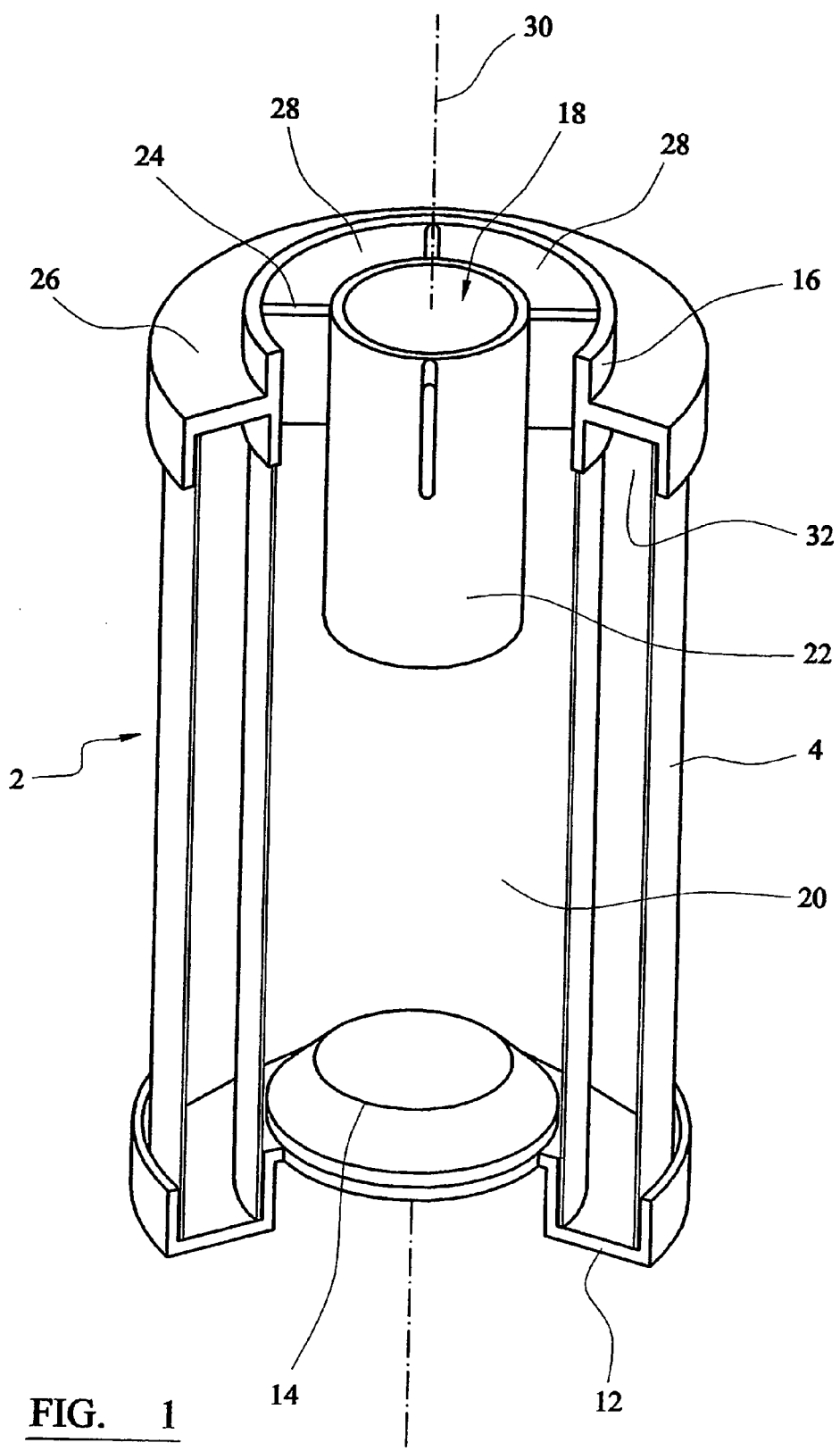
FIG. 1 is a cut away view from one side of a filter element according to the present invention.

Referring to the drawings, FIG. 1 shows a filter element 2 which comprises a cylindrical wall 4 constructed a suitable filter medium. The filter medium will be selected according to the requirements on the filter when in use, for example in terms of the nature and quantity of the impurity (for example as to whether it comprises liquid impurity or solid impurity or both) in the gas stream, the degree of filtration required of the medium, the pressure to which the assembly is exposed when in use. When the impurity to be collected includes liquid (which will generally be present as an aerosol for example of compressor oil), the filter medium will preferably be capable of causing liquid droplets to coalesce. Materials suitable for use in a coalescing filter element are known, including those sold by Domnick Hunter Limited under the trade mark OIL-X. Suitable materials include borosilicate and other glass fibres, activated carbon materials, activated silica materials and so on.

The filter element is closed at its bottom end by means of a bottom end cap 12. The bottom end cap has a raised central portion 14, defining an annular recess for collection of liquid around the base end cap at the base of the element wall 4.

The element includes a top end cap 16 which has a port 18 in it through which gas can enter the hollow space 20 defined by the element wall. The port comprises a central tube 22 which is supported in the port by means of four equally spaced vanes 24 (of which three are visible) within it, each extending between the central tube 22 and the peripheral portion 26 of the end cap. Each of the vanes is arranged so that it is aligned with the axis 30 of the device. The flow of a compressed gas in to the hollow space 20 is split between the central tube 22 and peripheral openings 28 which are defined by the central tube 22, the peripheral portion 26, and the vanes 24.

The top end cap is connected to the element wall provided by the filtration material 4 mechanically by fitting the filtration material into the groove 32 in the top end cap. The filtration material can be held in that groove by means of, for example, an interference fit and the use of an adhesive material. Similar connection techniques can be used to fasten the bottom end cap to the element wall.

The top end cap can include formations to enable a connection to be made between it and a housing for the element. For example, the top end cap can be formed with a male thread or with appropriate bayonet ramp formations, commonly to provide the male part of a threaded or bayonet connection. For example, the filter element can be fitted into an opening in a pressurised gas distribution plate, or in a cylindrical housing.

In use, the filter element is installed in an appropriate housing to which it is sealed so that a pressure differential is maintained across the wall of the element. Gas is supplied to the hollow space 20 within the filter element through the port 18 in the top end cap 16. Gas flowing through the central tube 22 of the end cap 16 tends to be projected further into the hollow space 20 than gas flowing into the hollow space through the peripheral openings 28. This can aid distribution of contaminants across the available surface area of the filtration material.

Gas flows through the filter element wall 4 provided by the filtration material. Particles within the gas stream are retained within the filtration material. Liquid droplets collect within the filtration material and coalesce. They then flow down the element wall and collect in the base of the element. Clean gas is then collected from the space around the tubular element for supply for an end use application.

Figure 2:
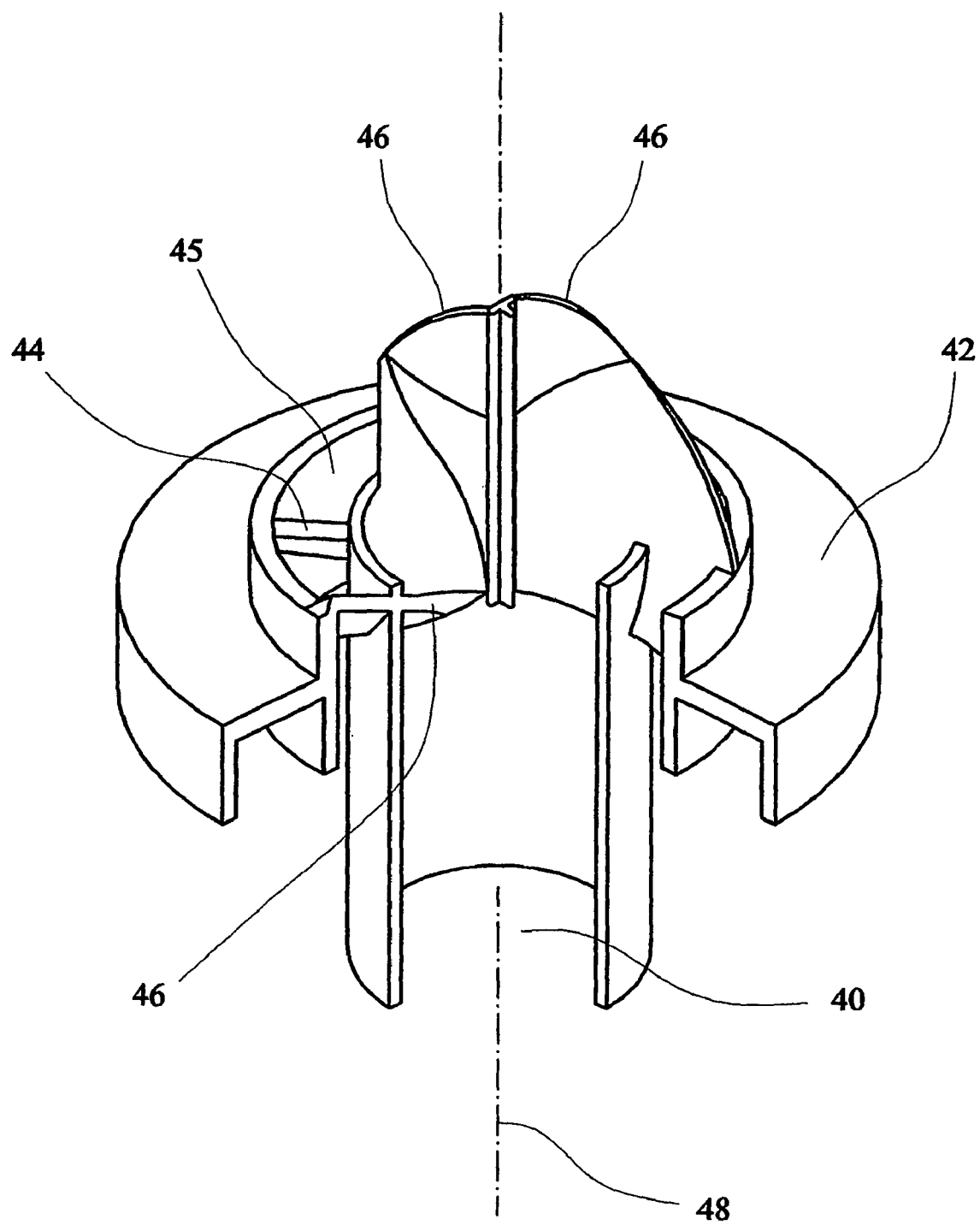
FIG. 2 is a cut away view from one side of a top end cap of another filter element.

FIG. 2 shows an alternative construction of top end cap for a filter element. The end cap comprises a central tube 40 and a peripheral portion 42, and the central tube is held relative to the peripheral portion by a plurality of transversely extending vanes 44. The central tube, the peripheral portion of the end cap and the transversely extending vanes define peripheral openings 45. The central tube also contains vanes 46 which are spaced uniformly around the axis 48 of the end cap and which are joined to one another on the axis. Each of the vanes which define the peripheral openings 45 and in the central tube 40 is inclined to the axis 48 of the end cap so that gas flowing over the vanes has a cyclonic twisting movement imparted to it.

The invention claimed is:

1. A coalescing filter element for removing liquid droplets from a gas stream, which comprises a wall which is made of a coalescing filtration material and which defines a hollow space within it, and an end cap at one end of the element which has a port in it through which gas is supplied to the hollow space to flow through the wall of the filtration material, the end cap comprising a peripheral portion which engages the element wall and a tube which extends into the hollow space defined by the element wall, so that the port in the end cap comprises an inner opening defined by the tube and at least one peripheral opening located between the tube and the peripheral portion of the end cap, with the tube extending beyond the peripheral opening(s) so as to deliver gas to a region of the element wall which is remote from the end cap.

2. A filter element as claimed in claim 1, in which the tube which defines the inner opening is supported by means of at least one vane which extends between it and the peripheral portion of the end cap.

3. A filter element as claimed in claim 2, which comprises at least three vanes extending between the tube and the peripheral portion of the end cap.

4. A filter element as claimed in claim 2, in which the vanes are arranged so that they imparts a helical flow to gas flowing through the peripheral openings, relative to the axis defined by the port.

5. A filter element as claimed in claim 1, in which the tube is located approximately centrally in the inlet port.

6. A filter element as claimed in claim 1, in which the ratio of the length of the tube measured from the edge of the element wall where the end cap engages the wall, to the overall length of the wall, is at least about 0.1.

7. A filter element as claimed in claim 1, in which the ratio of the area of the inner opening in the port to the total area of the peripheral opening (or openings) is not more than about 0.6.

8. A filter element as claimed in claim 1, in which the ratio of the area of the inner opening in the port to the total area of the peripheral opening (or openings) is at least about 0.25.

9. A filter element as claimed in claim 1, in which the tube contains at least one vane within it for imparting a helical flow to gas flowing through the tube, relative to the axis of the tube.

\* \* \* \* \*